US012772993B2

(12) United States Patent
Gross

(10) Patent No.: US 12,772,993 B2
(45) Date of Patent: Oct. 27, 2026

(54) APPARATUS FOR SPREADING AND SHAPING A FLOWABLE FROZEN FOOD

(71) Applicant: Steven Craig Gross, Longwood, FL (US)

(72) Inventor: Steven Craig Gross, Longwood, FL (US)

( * ) Notice: Subject to any disclaimer, the term of this patent is extended or adjusted under 35 U.S.C. 154(b) by 91 days.

(21) Appl. No.: 18/614,999

(22) Filed: Mar. 25, 2024

(65) Prior Publication Data

US 2024/0324624 A1 Oct. 3, 2024

Related U.S. Application Data

(60) Provisional application No. 63/456,048, filed on Mar. 31, 2023.

(51) Int. Cl.
*A23G 9/28* (2006.01)

(52) U.S. Cl.
CPC .......... *A23G 9/281* (2013.01); *A23G 2220/00* (2013.01)

(58) Field of Classification Search
CPC ...... A23G 9/281; A23G 2220/00; A23G 9/22; A23G 9/285; A23G 9/283
See application file for complete search history.

(56) References Cited

U.S. PATENT DOCUMENTS

| | | | | |
|---|---|---|---|---|
| 2,136,224 A * | 11/1938 | Weinreich | A23G 9/283 | 141/257 |
| 2,987,859 A * | 6/1961 | Forth | B65B 63/08 | 53/551 |
| 3,255,938 A * | 6/1966 | Dimmich | A23G 9/281 | 251/324 |
| 5,208,050 A * | 5/1993 | Ney | A23G 9/045 | 222/386 |
| 2010/0119677 A1* | 5/2010 | Chay | A23G 9/22 | 426/515 |

FOREIGN PATENT DOCUMENTS

| | | | |
|---|---|---|---|
| DE | 3825855 A1 * | 3/1989 | A23G 9/285 |
| DE | 202015008572 U1 * | 1/2016 | A23G 9/28 |
| EP | 4014747 A1 * | 6/2022 | A23G 9/22 |

* cited by examiner

*Primary Examiner* — Donnell A Long
(74) *Attorney, Agent, or Firm* — BURR & FORMAN

(57) ABSTRACT

An apparatus configured for the spreading and shaping of frozen food, such as soft-serve ice cream, flowing therethrough is provided. The apparatus includes an inverted funnel including a top orifice having a first area and a bottom orifice having a second area, wherein the second area is larger than the first area. The apparatus also includes a shape-forming plate that is releasably coupled directly or indirectly to the bottom orifice of the inverted funnel, in which the shape-forming plate comprises a plurality of shape-forming orifices. A frozen food directly or indirectly enters the apparatus via the top orifice and exits the apparatus via the plurality of shape-forming orifices.

19 Claims, 17 Drawing Sheets

APPARATUS FOR SPREADING AND SHAPING A FLOWABLE FROZEN FOOD

TECHNICAL FIELD

Embodiments of the presently-disclosed invention relate generally to an apparatus configured for the spreading and shaping of frozen food, such as soft-serve ice cream, flowing therethrough. The apparatus utilizes an inverted funnel and a shape-forming plate to spread and shape a frozen food into a desired shape for one or more servings.

BACKGROUND

Many people particularly enjoy ordering and eating spaghettieis sundaes, which are well known in Germany. People are often in awe with the finished product (e.g., spaghettieis sundaes) due to their visually attractive nature resembling a plate of pasta when being served for consumption. The shape and presentation seem to improve the taste and experience for many individuals. Spaghettieis is german for "Spaghetti Ice Cream", and is achieved primarily by scooping ice cream into a hand-held device (e.g., a table-top device a table-top "spaghetti ice cream" press consisting of a granite base, stainless steel post, plunger, and a cup attachment with holes) which is manually squeezed to extract the ice cream in the form of strands ("spaghetti noodles") onto a plate. Alternative methods to making spaghettieis exist in which the pushing of ice cream through a plate with holes is automated, but these devices still require manually placing a frozen product into a cup and starting the machine, which then plunges the frozen product through a plate with holes creating the spaghetti strands.

Most soft-serve frozen ice cream machines are used to serve ice cream, frozen custard, frozen yogurt, etc. The frozen product is kept at temperature inside the machine, and the user of the machine extracts serving(s) of the frozen product by pulling on a lever which opens passageway(s) through which the product exits the machine through a "nozzle". The nozzle is typically around 1" to 1.25" in diameter. The frozen product may be shaped to form a more attractive shape by passing through a "cap" that is installed on the nozzle. The shape of the opening in the cap, typically a 6- or 8-point star, helps make the frozen product appetizing for the customer. The limitation of using the cap to shape the frozen product is that the size of the frozen product is generally limited to no greater than the diameter of the nozzle. In this regard, the shape-manipulation of soft-serve ice cream has been particularly limited.

Accordingly, there remains a need in the art for an apparatus, which may be releasably attached directly or indirectly to a frozen food discharging machine, through which frozen food (e.g., soft-serve ice cream) flows, spreads into a desired shape, and is extracted over a much larger area for being deposited onto a serving implement (e.g., plate or bowl).

SUMMARY OF INVENTION

One or more embodiments of the invention may address one or more of the aforementioned problems. Certain embodiments according to the invention provide an apparatus comprising an inverted funnel including a top orifice having a first area and a bottom orifice having a second area, wherein the second area is larger than the first area, and a shape-forming plate that is releasable coupled directly or indirectly to the bottom orifice of the inverted funnel, the shape-forming plate comprising a plurality of shape-forming orifices.

In another aspect, the invention provides a system comprising an apparatus configured to spread and shape a flowable frozen food, such as those described and disclosed herein, and a soft-serve ice cream machine including a product outlet, in which the product outlet of the soft-serve ice cream machine is directly or indirectly coupled to a top orifice of an inverted funnel of the apparatus.

In yet another aspect, the invention provides a method of making a shaped frozen food serving comprising a step of discharging a flowable frozen food from a soft-serve ice cream machine, receiving the flowable frozen food in an apparatus configured to spread and shape a flowable frozen food, such as those described and disclosed herein, passing the flowable frozen food through the apparatus, and discharging the flowable frozen food from the apparatus.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

and

Figure 11:
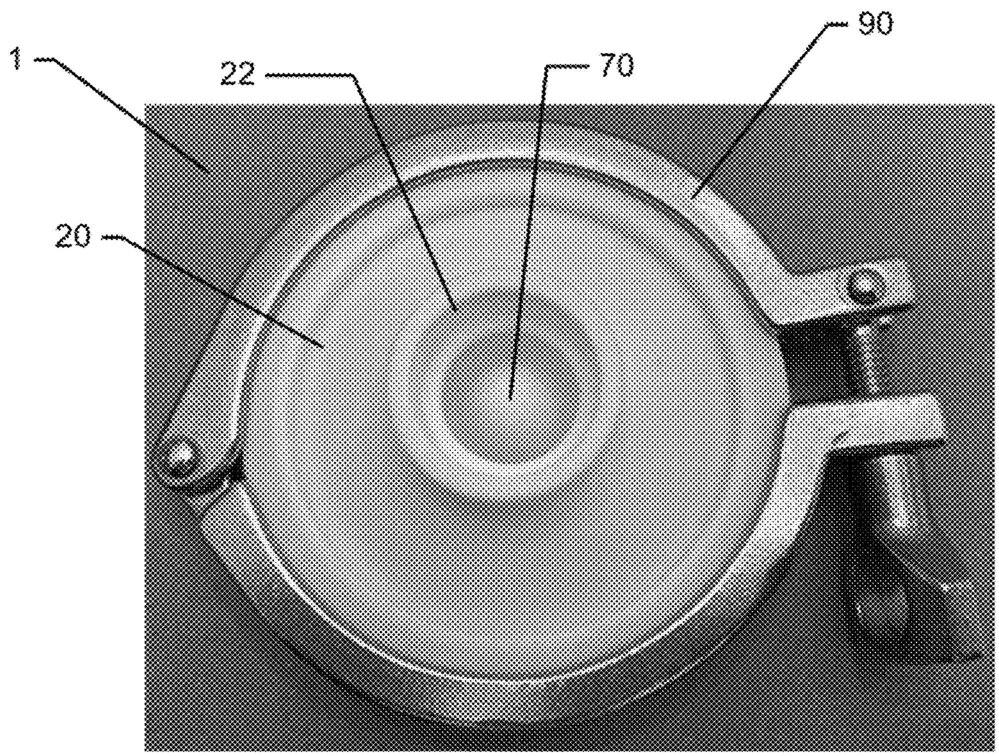
FIG. 11 illustrates a top view of an assembled apparatus according to certain embodiments of the invention.
Figure 14:
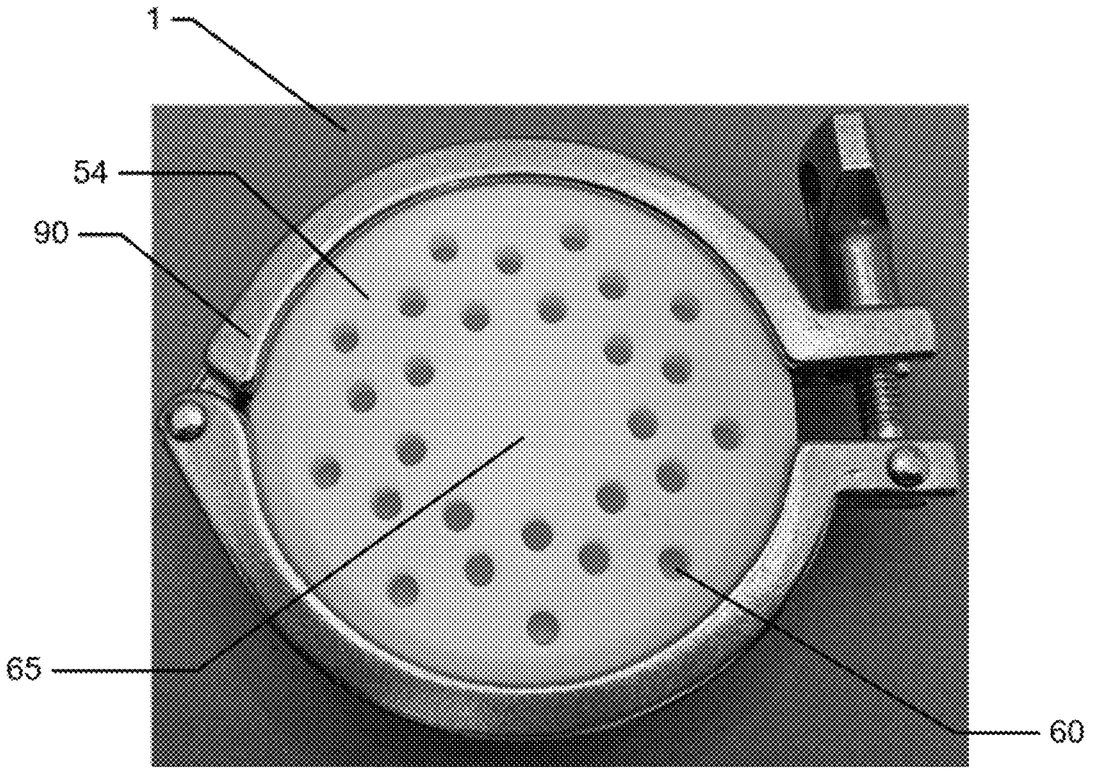

FIG. 14 illustrates a bottom view of the assembled apparatus of FIG. 11.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1:
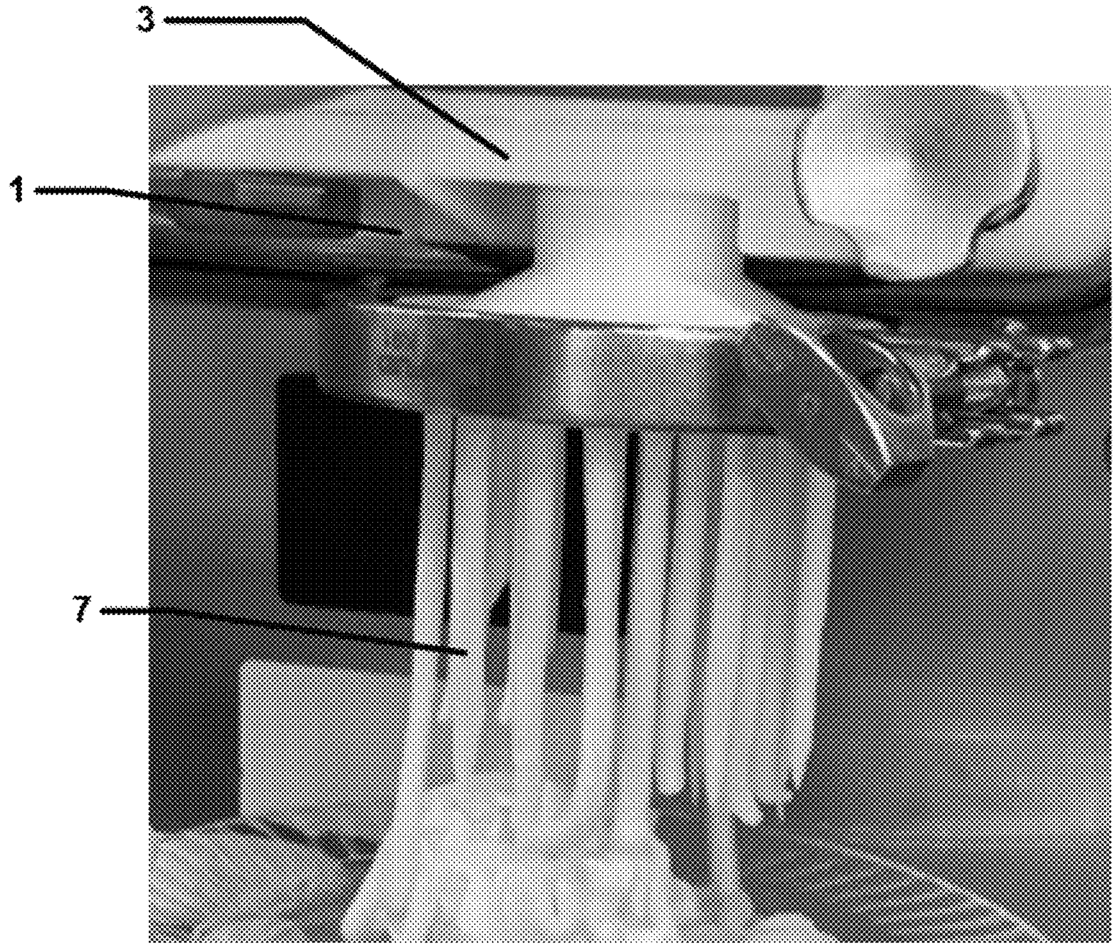
FIG. 1 illustrates an apparatus according to certain embodiments of the invention coupled to a soft-serve ice cream machine.

The presently-disclosed invention relates generally to an apparatus that may connect directly to many soft-serve ice cream machines, and once connected it will produce the desired shape for one or multiple servings of a flowable frozen food, such as soft-serve ice cream. The apparatus can be easily removed from the soft-serve ice cream machine to restore it to the original use of the machine if or when desired. The apparatus utilizes the combination of an inverted funnel and a shape-forming plate, in which the flowable frozen food is discharged into the apparatus via a top portion of the apparatus, flows through the apparatus and is spread out over a larger surface area relative to the outlet of the machine, and discharged out of a plurality of shape-forming holes formed in the shape-forming plate to provide one or more servings for consumption. FIG. 1, for example, illustrate an apparatus 1 coupled to a soft-serve ice cream machine 3. FIG. 1 also shows a plurality of strands of soft-serve ice cream 7 exiting the apparatus.

In one aspect, the present invention provides an apparatus comprising an inverted funnel including a top orifice having a first area and a bottom orifice having a second area, wherein the second area is larger than the first area, and a shape-forming plate that is releasable coupled directly or indirectly to the bottom orifice of the inverted funnel, the shape-forming plate comprising a plurality of shape-forming orifices. In accordance with certain embodiments of the invention, the second area is at least about 2 times larger than the first area, such as at least about any of the following: 2 times larger, 4 times larger, 5 times larger, 6 times larger, 8 times larger, or 10 times larger than the first area, and/or at most about any of the following: 20 times larger, 18 times larger, 15 times larger, 12 times larger, or 10 times larger than the first area. In this regard, a flowable frozen food entering the apparatus via the top orifice is dispersed over a significantly large area prior to exiting the apparatus. The spreading of the frozen food over a significantly larger area for extruding or discharging through the plurality of shape-forming orifices prevents the undesirable agglomerating or clumping-together of individual strands exiting the apparatus while still providing a desirably sufficient throughput of the flowable frozen food for practical preparation of multiple servings for consumption.

As noted above, and generally illustrated by FIG. 1, the top orifice may be configured or sized to directly or indirectly releasably couple to an outlet of a soft-serve ice cream machine. For example, the top orifice may be sized to receive the outlet of the soft-serve ice cream machine in a male-female configuration (e.g., the outlet of the soft-serve ice cream machine passes into and/or through the top orifice). The inverted funnel may be releasably coupled to the outlet of the soft-serve ice cream machine via friction and/or external clamping. For example, the inverted funnel may comprise one or more o-rings housed in associated grooves, in which the one or more o-rings are located to interface directly or indirectly with the outlet of the soft-serve ice cream machine. In this regard, the frictional forces between the apparatus and the outlet of the soft-serve ice cream machine may be sufficient to maintain connection between the two during ordinary operation, while removal may still be readily achieved by simply exerting a sufficient pulling force (e.g., by hand) to remove the apparatus.

In accordance with certain embodiments of the invention, the inverted funnel may include a down-spout portion extending downwardly from the top orifice towards the bottom orifice. The down-spout portion may have an internal diameter that is the same or substantially the same (e.g., plus or minus 10%) as the top orifice. Additionally or alternatively, the inverted funnel may comprise on outwardly flaring portion between the bottom orifice and the down-spout portion. For example, the down-spout portion may terminate and transition to the outwardly flaring portion of the inverted funnel. The outwardly flaring portion provides an increasing cross-section through which the flowable frozen food will flow. In this regard, the linear velocity of the flowing frozen food will be reduced and facilitate, at least in part, an even distribution of the frozen food across an inner face of the shape-forming plate located underneath the inverted funnel. The down-spout portion and the outwardly flaring portion collectively define an interior volume of the inverted funnel. As discussed below, certain embodiments of the invention may comprise minimizing this internal volume via incorporation of a flow diverter located on the shape-forming plate that extends into and occupies a portion of the internal volume. Such embodiments, for instance, reduce the potential amount of wasted product between change-outs of the apparatus as well as improve the even spread or distribution to the desired portion of the shape-forming plate. In accordance with certain embodiments of the invention, the outwardly flaring portion may have an average expansion rate defined as an average change of a width or cross-section over change of length in a z-direction from about 2 to about 20, such as at least about any of the following; 2, 4, 5, 6, 8, and 10, and/or at most about any of the following: 20, 18, 15, 12, and 10.

Figure 2:
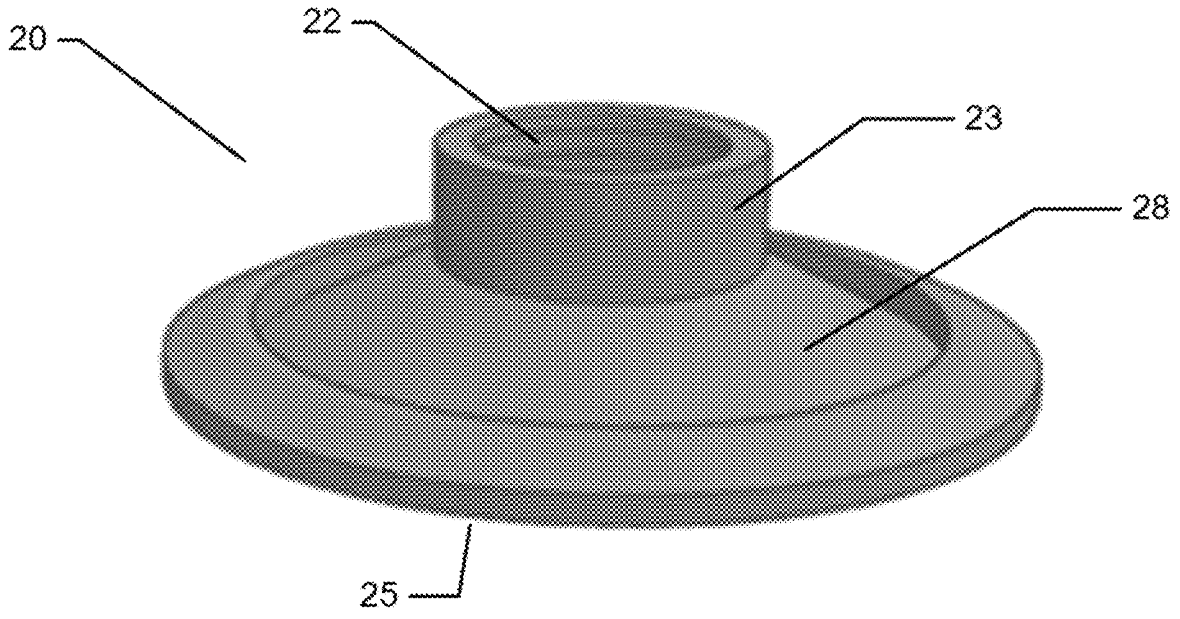
FIG. 2 illustrates a top isometric view of an inverted funnel according to certain embodiments of the invention.
Figure 3:
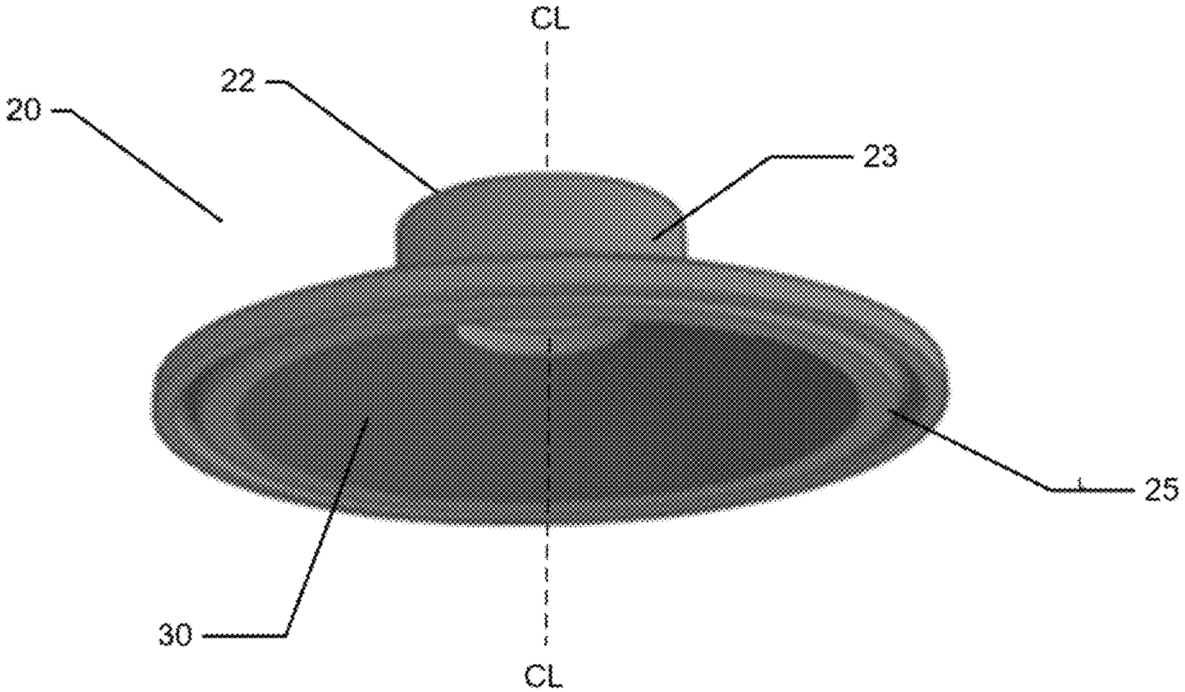
FIG. 3 illustrates a bottom isometric view of the inverted funnel of FIG. 2.
Figure 4A:
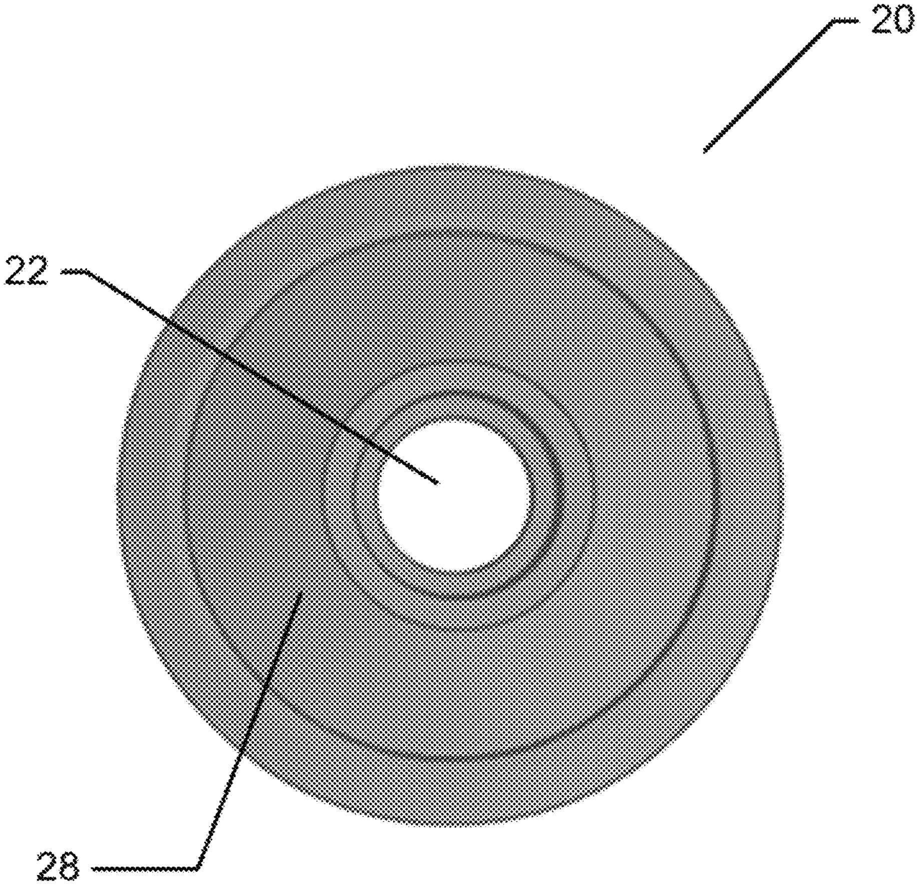
FIG. 4A illustrates a top view of the inverted funnel of FIG. 2.
Figure 4B:
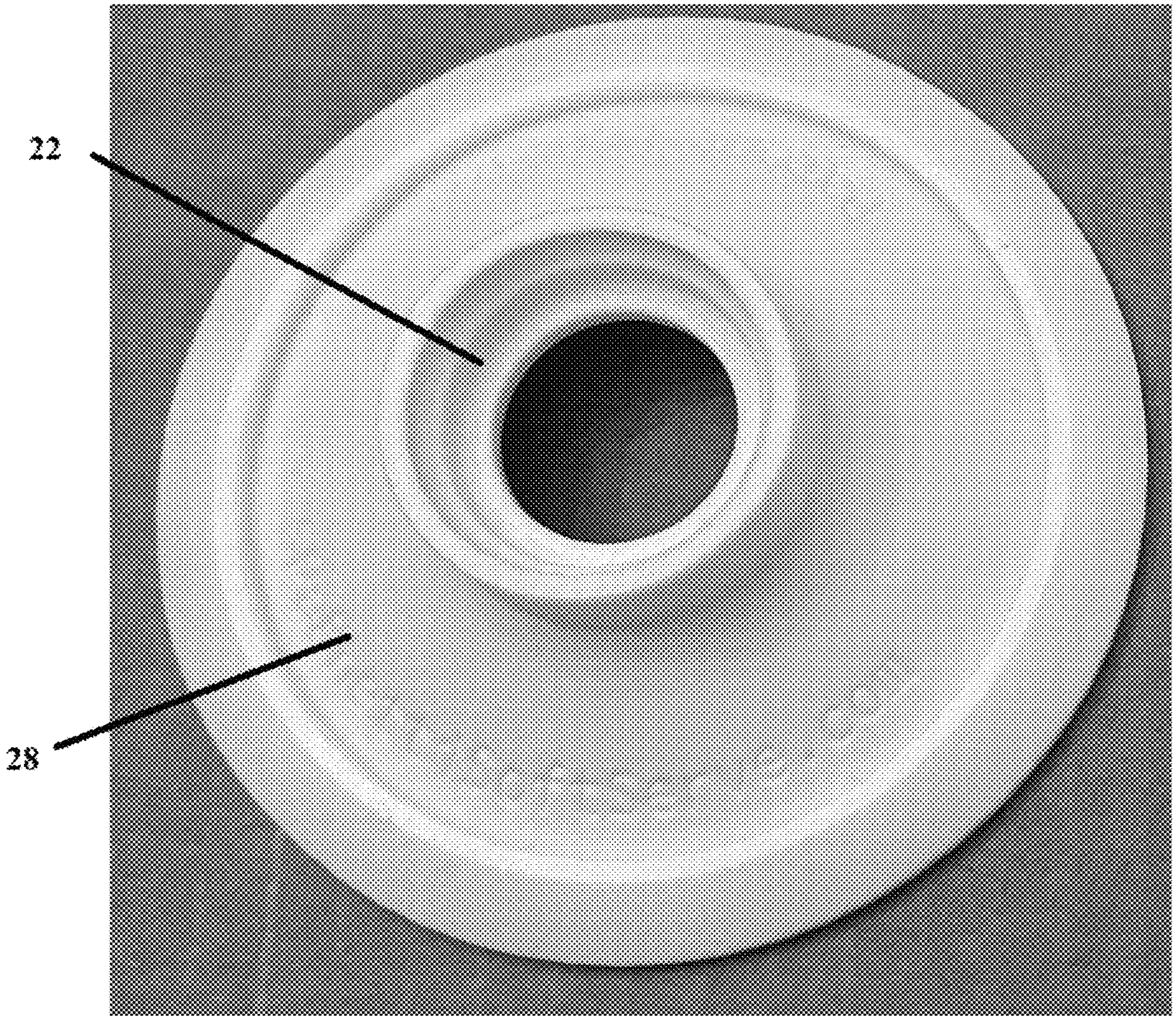
FIG. 4B illustrates a top view of one example inverted funnel according to certain embodiments of the invention.
Figure 5:
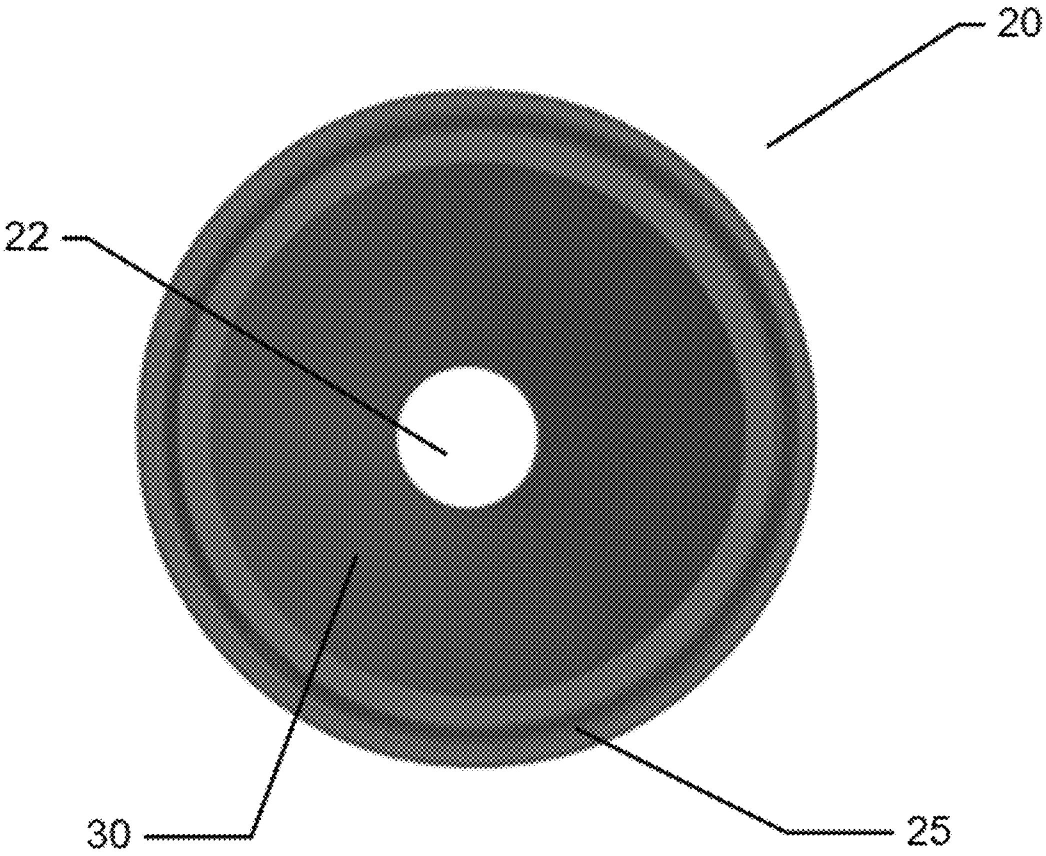
FIG. 5 illustrates a bottom view of the inverted funnel of FIG. 2.

FIG. 2 illustrates a top isometric view of an inverted funnel 20 according to certain embodiments of the invention. FIG. 2 illustrates that the inverted funnel 20 includes a top orifice 22, a down-spout portion 23, an outwardly flaring portion 28, and a bottom orifice 25. FIG. 3 illustrates a bottom isometric view of the inverted funnel of FIG. 2. As shown in FIG. 3, the inverted funnel 20 includes a top orifice 22 and an opposing bottom orifice 25. The inverted funnel also includes a down-spout portion 23 and an outwardly flaring portion 28 located between the top orifice 22 and the bottom orifice 25 (as best shown in FIG. 2). In this regard, the down-spout portion 23 may be adjacent the top orifice 22 and the outwardly flaring portion 28 may be adjacent the bottom orifice 25. FIG. 3 also illustrates an imaginary centerline "CL" extending through a top center point of the top orifice 22 of the inverted funnel 20 and through a bottom center point of the bottom orifice 25 of the inverted funnel. As also illustrated by FIG. 3, the down-spout portion 23 and the outwardly flaring portion 28 may define an interior volume 30 of the inverted funnel. FIG. 4A illustrates a top view of the inverted funnel of FIG. 2, while FIG. 5 illustrates a bottom view of the inverted funnel of FIG. 2. FIG. 4B illustrate a top view of an example inverted funnel configured to fit a Taylor Model 794 or similar soft-serve machine.

Figure 4C:
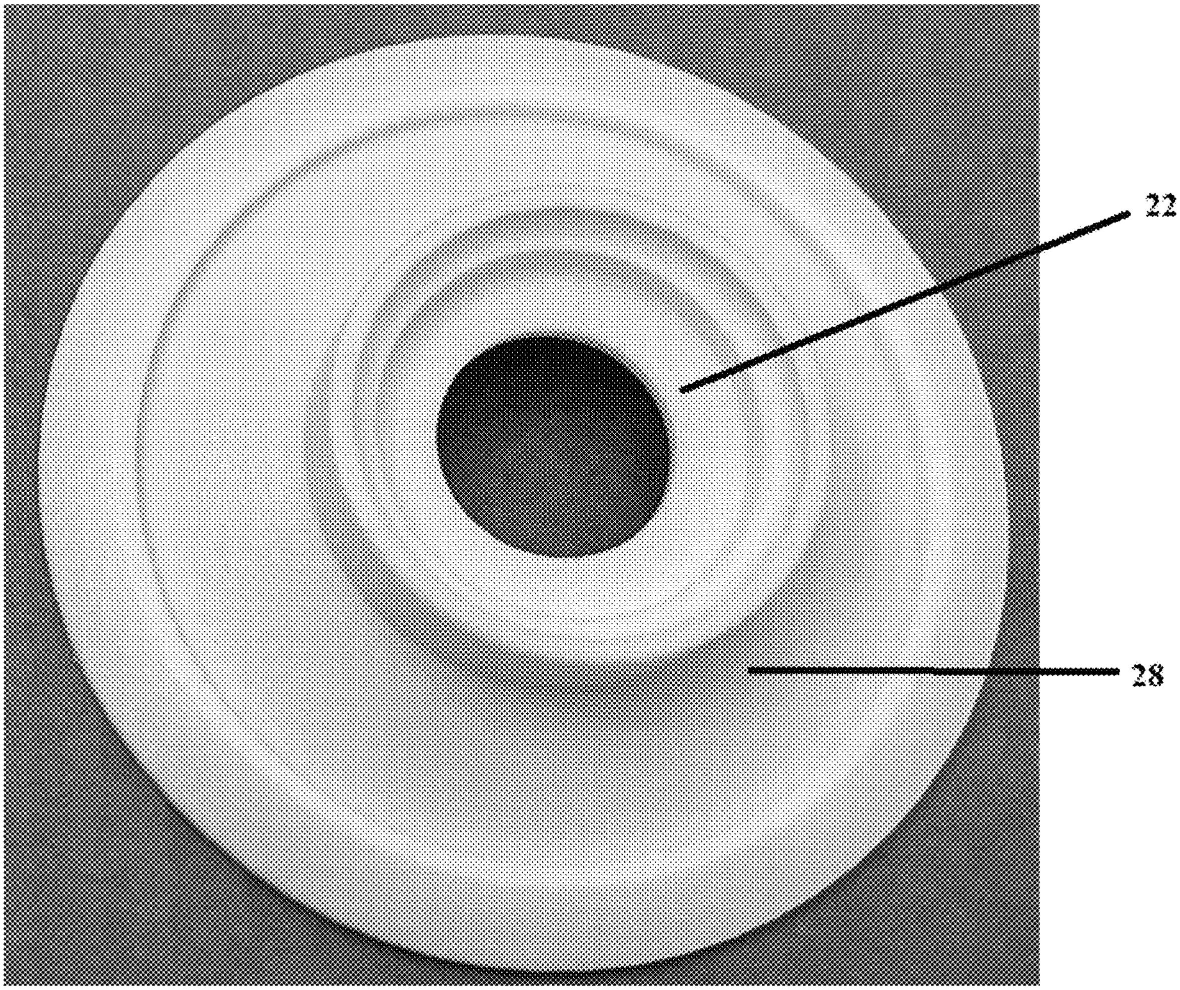
FIG. 4C illustrates a top view of another example inverted funnel according to certain embodiments of the invention.

There are many Taylor models that have the same dimensions for this part, including for example models 142, 150, 152, 161, 336, 338, 339, 632, 750, 751, 754, 774, 791, 794, 8752, 8756, C706, C712, C713, C717, C722/C722 ADA, and C723/C723 ADA machines. FIG. 4C illustrate a top view of an example inverted funnel configured to fit a Stoelting Model F131 or similar soft-serve machine. There are several models that have the same dimensions for this part, including for example 217, 0111, 0231, 0411, 0431, 0431-RC, 238R, E111, E131, E131-YG, F131, F131-YG, F144, F231, F431, SF144-12, SU444-12, U421, U431-12, and U444 Machines. As can be appreciated from FIGS. 4A and 4B, the main difference between these two example embodiments resides in the diameter of the top orifice 22. In this regard, non-limiting examples of the diameter for the top orifice may range from about 0.5 inches to about 3 inches, such as at least about any of the following: 0.5, 0.75, 1, 1.25, and 1.5 inches, and/or at most about any of the following: 3, 2.75, 2.5, 2.25, 2, 1.75, and 1.5 inches.

As noted above, the inverted funnel may be releasably coupled to the form-shaping plate. In this regard, the shape-forming plate may comprise in inner face located proximate to the top orifice and an external face located distal to the top orifice. In accordance with certain embodiments of the invention, the shape-forming plate may further comprise a flow diverter extending from the inner face upwardly towards the top orifice. As referenced above, the flow diverter may extend into the interior volume of the inverted funnel. In this regard, the interior volume of the inverted funnel may be reduced or minimized to reduce waste. Moreover, the flow diverter may create a dead-space, as discussed below, in which the number of the plurality of shape-forming orifices is reduced to avoid undesirable agglomeration or clumping-together of the individual streams of product exiting the apparatus. In accordance with certain embodiments of the invention, for instance, the plurality of the shape-forming orifices may be located on the outer portions or edges of the shape-forming plate. The flow diverter, if present, may be aligned with the centerline (i.e., “CL” in FIG. 3). In accordance with certain embodiments of the invention, the inner face of the shape-forming plate has a total inner area, and the flow diverter occupies from about 5% to about 30% of the total inner area, such as at least about any of the following 5, 8, 10, 12, 15, 18, and 20% of the total inner area, and/or at most about any of the following: 30, 28, 25, 22, and 20% of the total inner area.

In accordance with certain embodiments of the invention, the external face of the shape-forming plate may comprise a total exterior area, and the exterior face may comprise a reduced flow area comprising a reduced number of shape-forming orifices per unit area, an average reduced diameter, or being devoid of shape-forming orifices. For example, the reduced flow area may define a dead-zone, as noted above, that is devoid of any shape-forming orifices, in which the dead-zone is aligned with the flow diverter.

In accordance with certain embodiments of the invention, the plurality of shape-forming orifices may comprise from about 1 to about 50 individual shape-forming orifices, such as at least about any of the following: 1, 2, 4, 6, 8, 10, 12, 14, 16, 18, 20, 22, 24, 26, 28, and 30 individual shape-forming orifices, and/or at most about any of the following: 50, 45, 40, 38, 35, 32, and 30 individual shape-forming orifices. Additionally or alternatively, the plurality of shape-forming orifices may include a first group of shape-forming orifices each having a first open area, and a second group of shape-forming orifices each having a second open area that is different than the first open area. Additionally or alternatively, the plurality of shape-forming orifices may comprise an average open area, and wherein a ratio between the average open area and the total external area comprises from about 1:10,000 to about 1:100, such as at least about any of the following: 1:10,000, 1:8,000, 1:5,000, 1:2,000, and 1:1,000, and/or at most about any of the following: 1:100, 1:200, 1:400, 1:500, 1:800, and 1:1,000.

Figure 6:
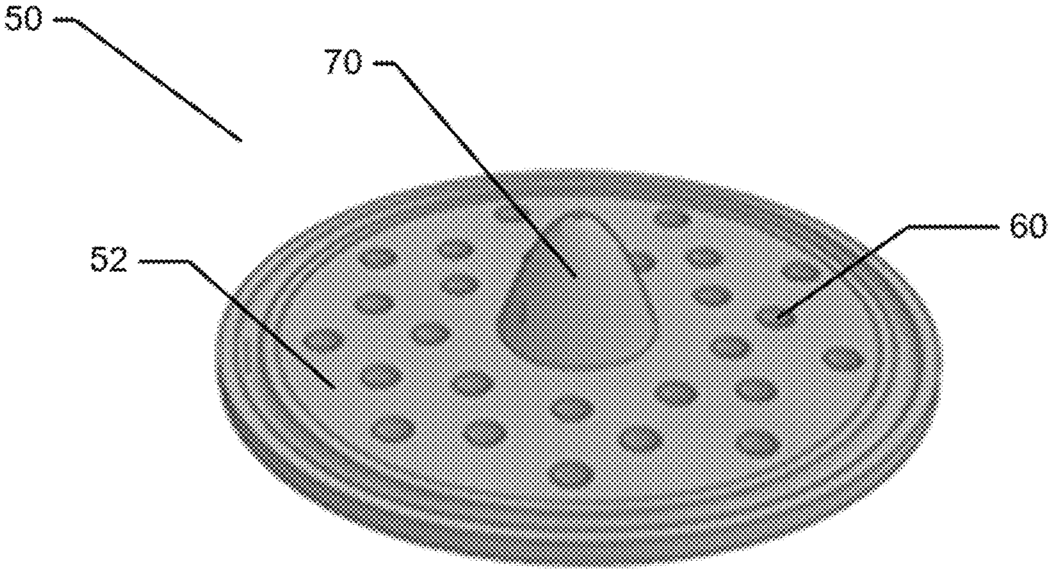
FIG. 6 illustrates a top isometric view of a shape-forming plate according to certain embodiments of the invention.
Figure 7:
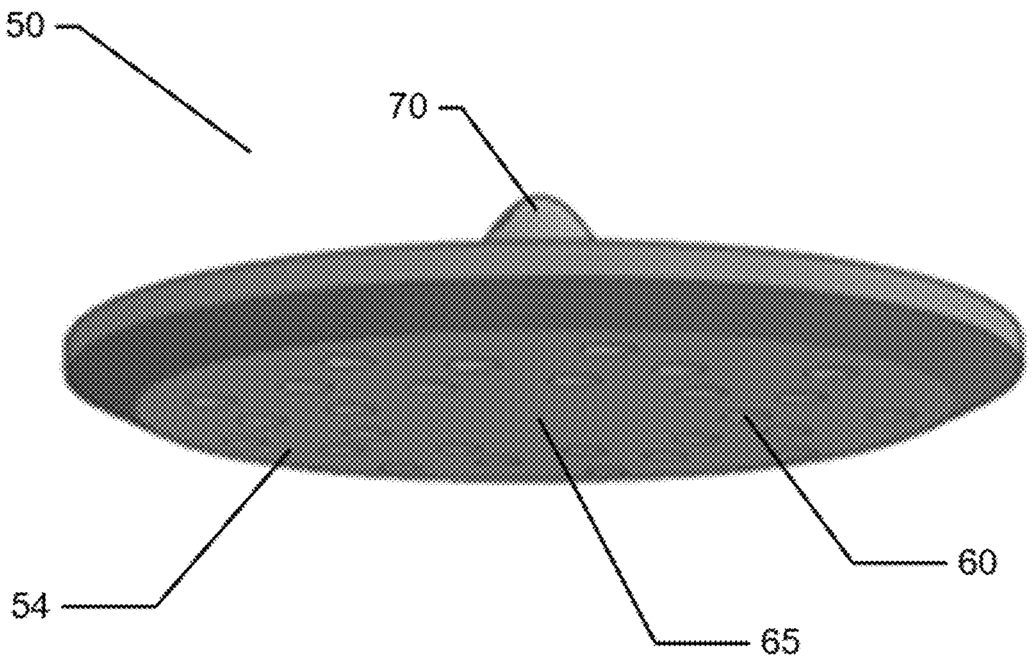
FIG. 7 illustrates a bottom isometric view of the shape-forming plate of FIG. 6.
Figure 8A:
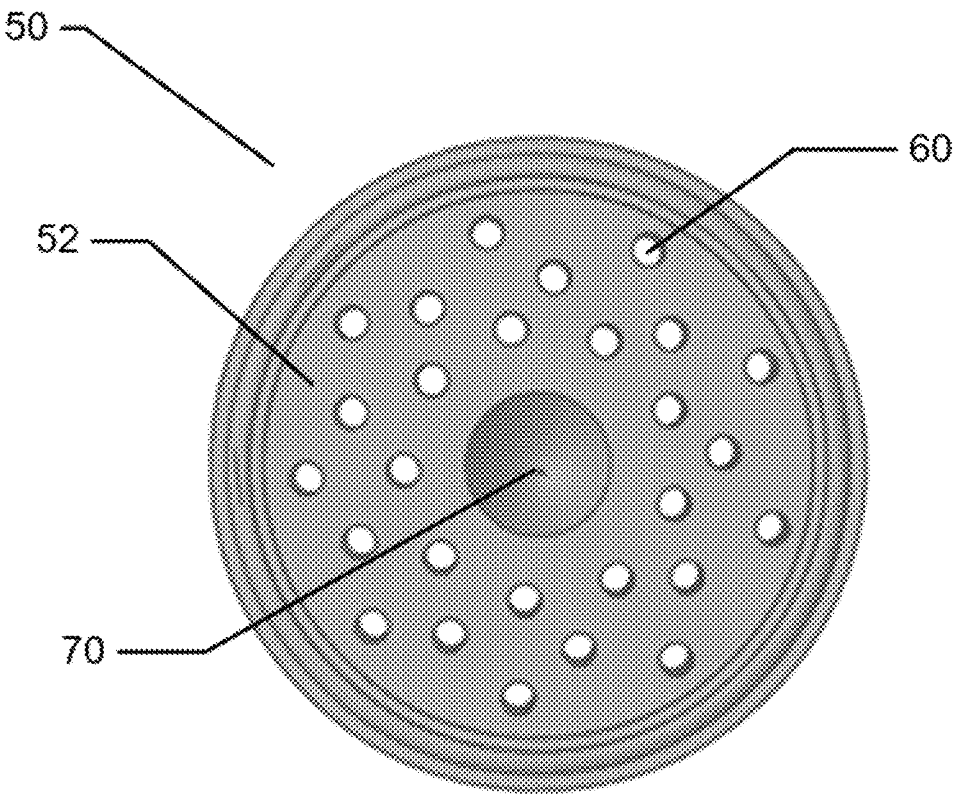
FIG. 8A illustrates a top view of the shape-forming plate of FIG. 6.
Figure 9:
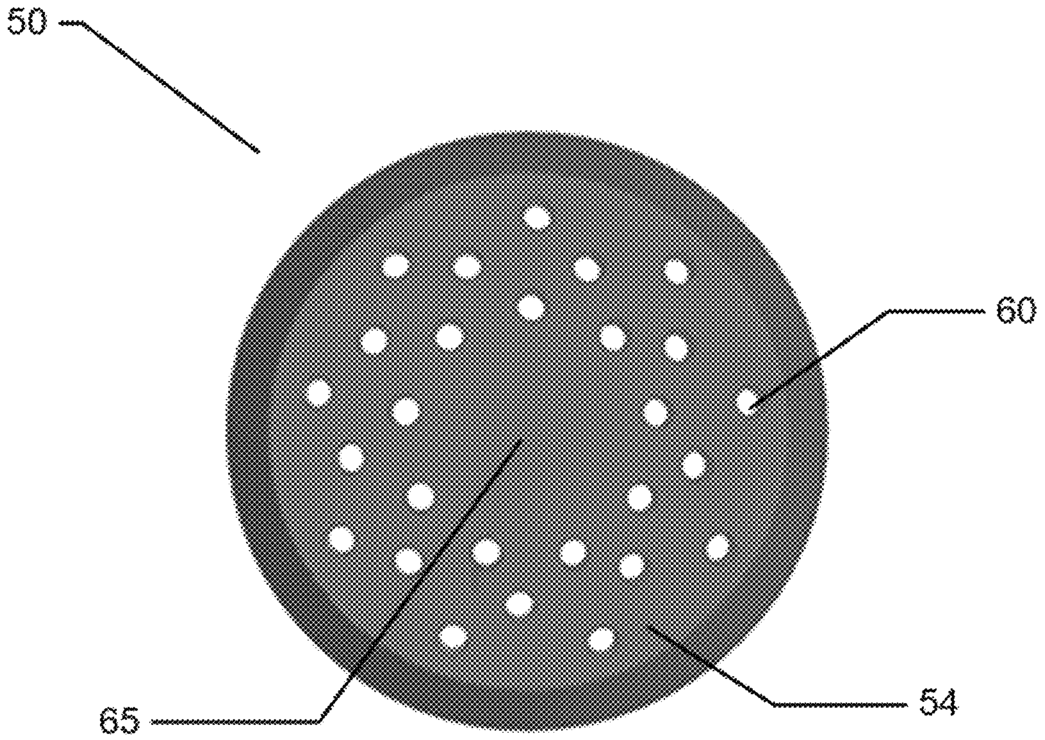
FIG. 9 illustrates a bottom view of the shape-forming plate of FIG. 6.

FIG. 6 illustrates a top isometric view of a shape-forming plate 50 according to certain embodiments of the invention. FIG. 6 shows that the shape-forming plate 50 includes an inner face 52 and a plurality of shape-forming orifices 60 that extend from the inner face to the external face 54 (shown in FIG. 7). FIG. 6 also shows a centrally located flow diverter 70 extending upwardly from the inner face 52. FIG. 7 illustrates a bottom isometric view of the shape-forming plate of FIG. 6. FIG. 7 illustrates a dead-zone 65 that is aligned with the flow diverter 70. FIG. 8A illustrates a top view of the shape-forming plate of FIG. 6 and FIG. 9 illustrates a bottom view of the shape-forming plate of FIG. 6

Figure 8B:
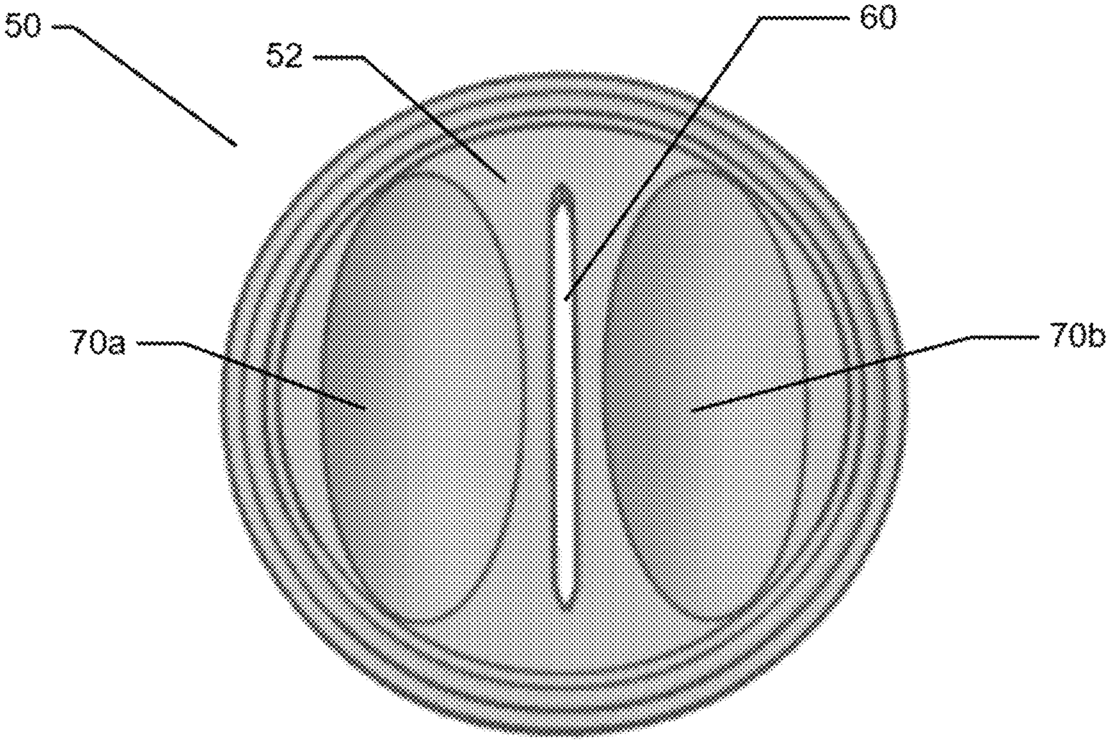
FIG. 8B illustrates a top view of a different shape-forming plate in accordance with certain embodiments of the invention.

In accordance with certain embodiments, the shape-forming plate may be devoid of a flow diverter, while in other embodiments the invention a flow diverter may be present but is not centrally located on the shape-forming plate (e.g., the flow diverter may be offset from a center point of the shape-forming plate. In accordance with certain embodiments of the invention, for example, the shape-forming plate may comprise a plurality of flow diverters (e.g., 2, 3, 4, 5, etc.) located at various relative positions on the shape-forming plate. By way of example, FIG. 8B illustrates a shape-forming plate 50 including a pair of flow diverters 70*a*, 70*b* located on the “sides” of the shape-forming plate. As shown in FIG. 8B, the pair of flow diverters 70*a*, 70*b* facilitate the flow and/or spread of the flowable frozen food about a central portion of the shape-forming plate 50 where a shape-forming orifice 60 is located. Such designs, for instance, may allow the flowable frozen food to spread in one direction only and exit the shape-forming plate 50 through a single shape-forming orifice 60 embodied as a central line (e.g., thin rectangular opening that may be linear or have one or more arcs therein to resemble one or more waves) that is taller and thinner than the machine opening (e.g., a tall rectangle) such that the flow of the frozen food forms the likeness of a lasagna noodle. Although not illustrated by FIG. 8B, the single shape-forming orifice 60 may be embodied as a wavy line and/or include arcuate portions at the ends of the orifice 60.

Figure 10:
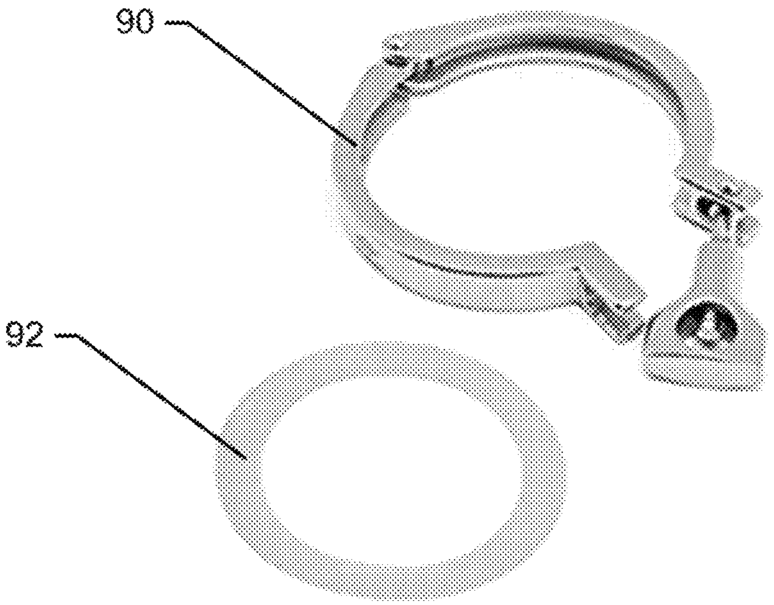
FIG. 10 illustrates a clamp and gasket associated with an apparatus, in accordance with certain embodiments of the invention.

In accordance with certain embodiments of the invention, the apparatus may also include a coupling component releasably engaged with the inverted funnel and the shape-forming plate, in which the coupling component releasably couples the inverted funnel directly or indirectly to the shape-forming plate. The coupling component, by way of example only, may comprise a clamp or one or more clips that releasably couple the inverted funnel directly or indirectly to the shape-forming funnel. The apparatus may also comprise a gasket located between the inverted funnel and the shape-forming plate. In this regard, the coupling component and the gasket may provide a more securely sealed coupling between the inverted funnel and the shape-forming plate to prevent inadvertent leakage of the flowable product between an interface between the inverted funnel and the shape-forming funnel. FIG. 10 illustrates an example of a clamp 90 and a gasket 92 associated with an apparatus, in accordance with certain embodiments of the invention. It should be noted, however, that the coupling component may be embodied by a variety of structures (e.g., band clamps, C-clamps, clips, spring-biased clamps, etc.)

Figure 12:
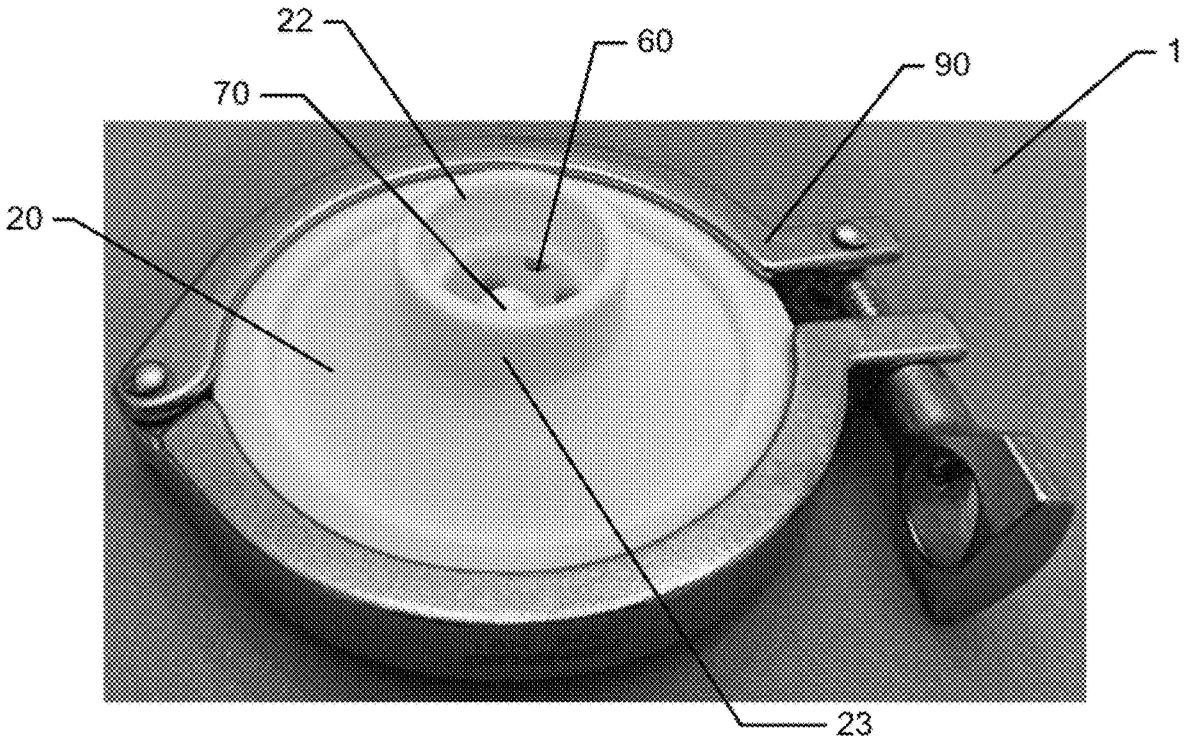
FIG. 12 illustrates a top isometric view of the assembled apparatus of FIG. 11.
Figure 13:
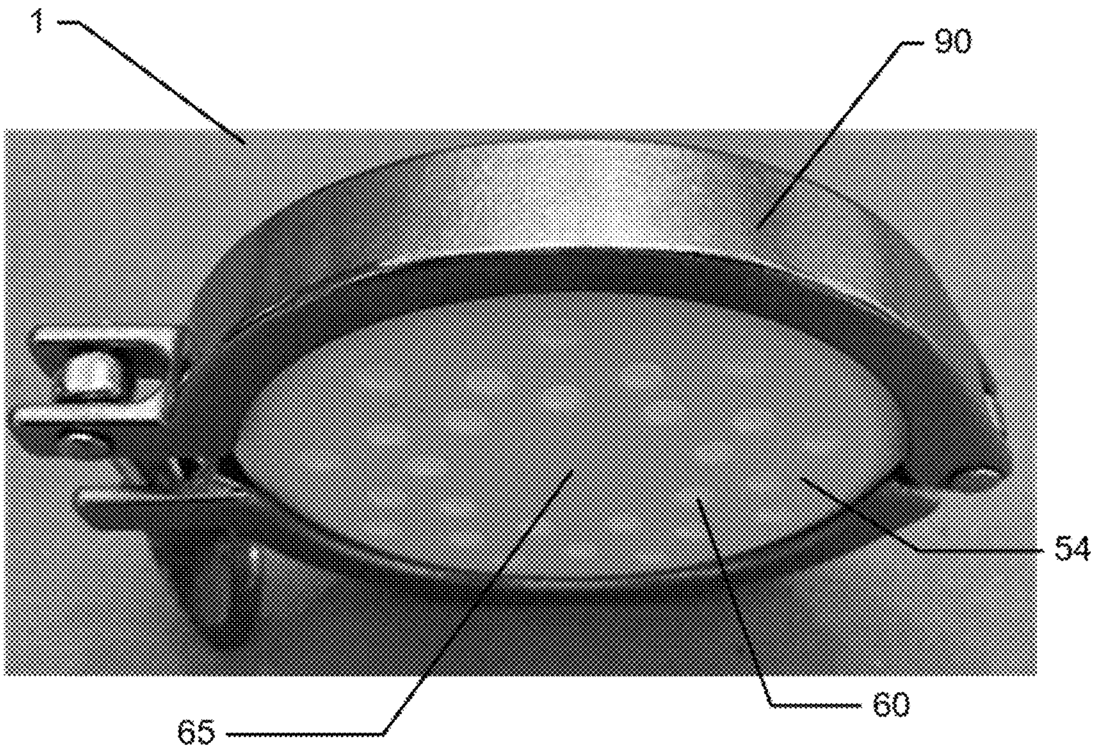
FIG. 13 illustrates a bottom isometric view of the assembled apparatus of FIG. 11.

FIG. 11 illustrates a top view of an assembled apparatus 1 according to certain embodiments of the invention. FIG. 11 illustrates the location of the flow diverter 70 relative to the top orifice 22. FIG. 12 illustrates a top isometric view of the assembled apparatus 1 of FIG. 11, in which the flow diverter 70 and a few of the plurality of shape-forming orifices 60 are visible through the top orifice 22 of the inverted funnel 20. FIG. 13 illustrates a bottom isometric view of the assembled apparatus 1 of FIG. 11, and FIG. 14 illustrates a bottom view of the assembled apparatus of FIG. 11.

In accordance with certain embodiments of the invention, the apparatus may be devoid of any moveable components during operation, such as a plunger or pressing lever.

The components of the apparatus may be produced from a variety of different materials by a variety of different manufacturing technologies. In accordance with certain embodiments of the invention, one or more of the components may be produced via a 3D printing operation. 3D-printed materials may be made food-safe in various ways. For example, after printing in stainless steel 316, a post-process can be used called "media blasting" after sintering, which smooths out any edges that may be left after the 3D print. Some plastics or resins that are used for 3D printing are also considered to be a food-safe materials before going through the 3D printing process, but after processing they also may have layers which can create food safety issues. Post-processing can address this issue, such as "vapor smoothing" (also called "chemical vapor smoothing). This process, when performed with industrial-grade 3D printing vapor smoothing equipment, can replace layer lines with smooth, glossy surfaces without sacrificing the part's features, strength and performance. Other production processes could produce parts with similar dimensions and the same functionality, such as injection molding or other processes. Therefore, other methodologies may be used to create future versions of this device.

In another aspect, the invention provides a system comprising an apparatus configured to spread and shape a flowable frozen food, such as those described and disclosed herein, and a soft-serve ice cream machine including a product outlet, in which the product outlet of the soft-serve ice cream machine is directly or indirectly coupled to a top orifice of an inverted funnel of the apparatus.

In yet another aspect, the invention provides a method of making a shaped frozen food serving comprising a step of discharging a flowable frozen food from a soft-serve ice cream machine, receiving the flowable frozen food in an apparatus configured to spread and shape a flowable frozen food, such as those described and disclosed herein, passing the flowable frozen food through the apparatus, and discharging the flowable frozen food from the apparatus.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein

What is claimed is:

1. An apparatus, comprising:

(i) an inverted funnel including a top orifice having a first area and a bottom orifice having a second area, wherein the second area is larger than the first area; and (ii) a shape-forming plate that is releasable coupled directly or indirectly to the bottom orifice of the inverted funnel, the shape-forming plate comprising a plurality of shape-forming orifices, wherein the shape-forming plate comprises an inner face located proximate to the top office and an external face located distal to the top orifice, and wherein the shape-forming plate further comprises a flow diverter extending from the inner face upwardly towards the top orifice.

2. The apparatus of claim 1, wherein the second area is at least about 2 times larger than the first area.

3. The apparatus of claim 1, wherein the top orifice is configured to directly or indirectly releasably couple to an outlet of a soft-serve ice cream machine, and wherein the top orifice is sized to receive the outlet of the soft-serve ice cream machine in a male-female configuration, and wherein the inverted funnel further comprises a down-spout portion extending downwardly from the top orifice towards the bottom orifice, wherein the down-spout portion has an internal diameter that is the same or substantially the same as the top orifice.

4. The apparatus of claim 3, wherein the inverted funnel comprises an outwardly flaring portion between the bottom orifice and the down-spout portion.

5. The apparatus of claim 1, wherein the flow diverter extends into an interior volume of the inverted funnel.

6. The apparatus of claim 5, wherein the flow diverter is aligned with a centerline extending through a top center point of the top orifice of the inverted funnel and through a bottom center point of the bottom orifice of the inverted funnel.

7. The apparatus of claim 5, wherein the inner face of the shape-forming plate has a total inner area, and the flow diverter occupies from about 5% to about 30% of the total inner area.

8. The apparatus of claim 1, wherein the external face comprises a total exterior area, and the exterior face comprises a reduced flow area comprising a reduced number of shape-forming orifices per unit area, an average reduced diameter, or being devoid of shape-forming orifices.

9. The apparatus of claim 8, wherein the reduced flow area defines a dead-zone that is devoid of any shape-forming orifices, and the dead-zone is aligned with the flow diverter.

10. The apparatus of claim 1, wherein the plurality of shape-forming orifices comprises from about 1 to about 50 individual shape-forming orifices.

11. The apparatus of claim 10, wherein the plurality of shape-forming orifices include a first group of shape-forming orifices each having a first open area, and a second group of shape-forming orifices each having a second open area that is different than the first open area.

12. The apparatus of claim 1, wherein the plurality of shape-forming orifices define an average open area, and wherein a ratio between the average open area and the total external area comprises from about 1:10,000 to about 1:100.

13. The apparatus of claim 1, further comprising a coupling component releasably engaged with the inverted funnel and the shape-forming plate, wherein the coupling component releasably couples the inverted funnel directly or indirectly to the shape-forming plate.

14. The apparatus of claim 13, wherein the coupling component comprises one or more screws, one or more nuts-and-bolts, a clamp, or one or more clips.

15. The apparatus of claim 1, wherein the inverted funnel way comprises one or more o-rings housed in associated grooves, wherein the one or more o-rings are located to interface directly or indirectly with an outlet of a soft-serve ice cream machine.

16. A system, comprising:

(i) an apparatus according to claim 1; and (ii) a soft-serve ice cream machine including a product outlet, wherein the product outlet of the soft-serve ice cream machine is directly or indirectly coupled to the inverted funnel of the apparatus.

17. A method of making a shaped frozen food serving, comprising:

(i) providing an apparatus configured to spread and shape a flowable frozen food according to claim 1;

(ii) discharging a flowable frozen food from a soft-serve ice cream machine into the apparatus;

(iii) receiving the flowable frozen food in the apparatus, passing the flowable frozen food through the apparatus, and discharging the flowable frozen food from the apparatus to provide a shaped frozen food serving.

18. The method of claim 17, further comprising directly or indirectly attaching the apparatus onto an outlet of the soft-serve ice cream machine.

19. The method of claim 17, wherein the shaped frozen food serving comprises a spaghettieis sundae.

* * * * *